United States Patent [19]

Wehrmeister

[11] 3,911,131
[45] Oct. 7, 1975

[54] TRANQUILIZERS

[75] Inventor: Herbert L. Wehrmeister, Terre Haute, Ind.

[73] Assignee: Commercial Solvents Corporation, Terre Haute, Ind.

[22] Filed: May 28, 1974

[21] Appl. No.: 473,534

Related U.S. Application Data

[62] Division of Ser. No. 312,075, Dec. 4, 1972, abandoned.

[52] U.S. Cl. .............................. 424/263; 424/270
[51] Int. Cl.² ................... A61K 9/20; A61K 31/44
[58] Field of Search ......... 260/240 D; 424/270, 263

[56] References Cited
UNITED STATES PATENTS

| | | | |
|---|---|---|---|
| 3,624,217 | 11/1970 | Koch.................................. | 424/246 |
| 3,629,247 | 12/1971 | McFarland et al. ............. | 260/240 D |
| 3,637,707 | 1/1972 | Koch.................................. | 424/270 |

*Primary Examiner*—Stanley J. Friedman
*Attorney, Agent, or Firm*—Robert H. Dewey; Howard E. Post

[57] ABSTRACT

Tranquilizing agents for warm-blooded animals corresponding to the formula

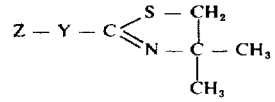

where Y can be $-(CH_2)_n-$ or $-CH=C-R$, where R can be hydrogen or methyl; Z can be pyridyl, or the group

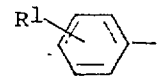

wherein $R^1$ is hydrogen, methoxy, chloro-, nitro-, or acetamido; or Z can be 3,4-methylenedioxophenyl.

10 Claims, No Drawings

TRANQUILIZERS

This is a division, of application Ser. No. 312,075, filed Dec. 4, 1972, now abandoned.

SUMMARY OF THE INVENTION

This invention relates to tranquilizing agents for warm-blooded animals. In a particular aspect, this invention relates to certain thiazolines useful as tranquilizing agents for animals.

It is an object of this invention to provide tranquilizing agents for warm-blooded animals.

It is another object of this invention to provide tranquilizing agents of the class of thiazolines.

Other objects of this invention will be apparent to those skilled in the art from the disclosure herein.

It is the discovery of this invention that compounds represented by the formula

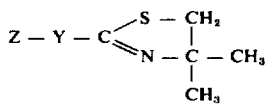

are central nervous system depressants which are useful in the calming of warm-blooded animals. In the formula, Y can be —$(CH_2)n$—, where $n$ is 1 or 2, or

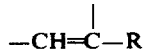

where R can be hydrogen or methyl.

Z can be pyridyl or the group

wherein $R^1$ is hydrogen, methoxy, chloro-, nitro-, or acetamido-; or Z can be 3,4-methylenedioxophenyl.

DETAILED DISCUSSION

The compounds of the present invention have been found to exert a depressant action on the central nervous system when tested under standard and accepted pharmacological procedures, in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically, the compounds may be employed to induce a calming effect in animals.

In the pharmacological evaluation of the biological activity of the compounds of this invention, the in vivo effects were tested by three different tests. In one, the oral toxicity was determined by administration to a group of laboratory mice. A trained observer watched the mice closely for several hours and noted decreased motor activity. The second test was the so-called "jiggle cage" method, a technique described by R. A. Turner, *Screening Methods in Pharmacology*, page 89, published 1965, Academic Press, New York, and summarized in Example 1. The third test was that described by Horn, *Biometrics*, 12:311 (1956). In this test, laboratory mice received the test compound (2 mice per dose level) at one-half log-dosage intervals by intravenous injection. The animals were observed by trained observers and pharmacological signs of tranquilization were noted. The median lethal dose ($LD_{50}$) and the median effective dose ($MED_{50}$) were estimated. The safety factor was taken as the ratio of $LD_{50}/MED_{50}$.

The compounds of this invention are active as central nervous system depressants at a dose of about 0.01 to about 1000 mg/kg. When the compounds are administered intravenously, a dose within the range 1.8-100 mg/kg is generally preferred, depending on the compound. When the compounds are administered orally, a dose within the range of 10-500 mg/kg is generally preferred, depending on the compound.

The thiazolines of the present invention are derivatives of 2,4,4-trimethyl-2-thiazoline which can be readily prepared by known methods, e.g. the method of G. R. Handrick et al., *J. Med. Chem.* 8, 762 (1965). In general, the compounds are readily prepared by reacting 2,4,4-trimethyl-2-thiazoline with the appropriate aldehyde following the procedure of H. L. Wehrmeister, *J. Org. Chem.* 27, 4418 (1962) for preparing analogous oxazolines. The compounds of examples 7 and 8 are exceptions, however. Their preparation is given in the examples.

Thiazolines are weakly alkaline and form salts with most acids. Many of these salts are water-soluble and this invention contemplates the administration of pharmaceutically acceptable salts of these thiazolines.

The invention will be better understood with reference to the following examples. It is understood, however, that the examples are intended for illustration only and it is not intended that the invention be limited thereby.

EXAMPLE 1

2-(2-p-Chlorophenylethenyl)-4,4-dimethyl-2-thiazoline (P-1896) was synthesized from p-chlorobenzaldehyde and 2,4,4-trimethyl-2-thiazoline, which is commercially available, by the following procedure.

A stirred mixture of 42.4 g (0.3 mole) p-chlorobenzaldehyde, 39.2 g (0.3 mole) 2,4,4-trimethyl-2-thiazoline, and 1 g sodium bisulfate in 100 ml xylene was heated at reflux under a 4-bulb Snyder column, water separator (20 ml) and reflux condenser with azeotropic removal of 5.4 ml water in 4½ hours ($t$=150°–159°).

The pot mixture was then filtered at room temperature through filter aid and the filter cake was washed with 25 ml of warm xylene. The filtrate plus wash was cooled in a refrigerator. The solid that precipitated was collected by filtration, washed with 25 ml xylene and dried in a vacuum desiccator, m.p. 84°–86°.

Anal. Calcd. for $C_{13}H_{14}ClNS$: C, 62.01; H, 5.60; N, 5.56; Cl, 14.08; S, 12.73. Found: C, 62.41, 62.49; H, 5.66, 5.78; N, 5.67, 5.33; Cl, 13.81; S, 14.18, 12.61.

The nuclear magnetic resonance (nmr) spectrum and the IR spectrum were consistent with the structure assigned. Evidence from nmr indicates that the olefinic hydrogens are probably trans.

The acute $LD_{50}$ by oral administration to mice was 1140 ± 42 mg/kg. The $LD_0$ was 1000 mg/kg and the $LD_{100}$ was 2000 mg/kg. Animals receiving the compound were strongly tranquilized. The compound was tested for tranquilizing activity by the method of Horn.

The compound was dissolved in polyethylene glycol 300 and was administered intravenously at dosage levels of 10, 32, 100 and 320 mg/kg. to mice, two animals per dosage level. The dilution was such that each animal received a dose of 1 ml of solution per kilogram of body weight. A trained observer watched the animals for evidence of central nervous system depressant activity in general and tranquilizing activity in particular. The dosage at which these signs became apparent was reported as the median effective dose ($MED_{50}$). Also, the $LD_{50}$ by intravenous administration was estimated and the safety factor, the ratio of $LD_{50}/MED_{50}$, was determined. For P-1896, the $LD_{50}$ by intravenous administration was greater than 320.0 mg/kg. The median effective dose for tranquilization was 5.6 (1.8–18.0 ) mg/kg, and the safety factor was greater than 57.0.

EXAMPLE 2

The experiment of Example 1 was repeated in all essential details except that p-methoxybenzaldehyde was substituted for p-chlorobenzaldehyde. The product thereby obtained was 4,4-dimethyl-2-(2-p-methoxyphenylethenyl)-2-thiazoline (P-1874).

The acute $LD_{50}$ of this compound by oral administration to mice was determined to be 2400 ± 394 mg/kg. The $LD_0$ was 1000 mg/kg and the $LD_{100}$ was less than 5000 mg/kg. Animals receiving the compound were tranquilized.

The product was tested for tranquilizer activity by the jiggle-cage method of R. A. Turner, *Screening Methods in Pharmacology*, page 89, Academic Press, New York (1965). In this method, a cage is suspended from a rope and rests lightly on a pneumatic bed connected by a tube to a transducer. Activity by an animal (the rat, in these tests) in the cage results in changes of pressure on the pneumatic bed. The transducer changes these pressure variations to electrical impulses which are continuously recorded on a chart, making it possible to quantitate the amount, severity and frequency of the movement. The rats were fasted for 48 hours prior to testing to insure a high level of activity in the test cage.

At the time of the test, each rat was weighed and placed in the jiggle cage. All activity of the rat was measured by the pneumatic sensor. The rat was then removed from the cage and dosed with either a test material, negative control material, or standard material.

The rat was then placed in its original cage for 30 minutes. Following this, the rat was returned to the jiggle cage for ten minutes and all activity recorded. The test, control, and standard material were given to the rats via stomach tube.

The above compound (P-1874) was tested on three rats using the above procedure. With each run a standard, chlordiazepoxide hydrochloride, and negative control test were performed on at least one rat. Polyethylene glycol 400 was used as the solvent in each case. The standard and all test substances were administered by stomach tube at a dosage level of 1 mg per 100 grams of body weight.

The results obtained are as follows:

ACTIVITY DATA

| Rat No. | Condition | Σ of Evaluation Scores (ΣS) | Average Activity Value Σ÷600 |
|---|---|---|---|
| 1 | Control (neg.) | 1606 | 2.68 |
|   | Standard | 420 | 0.70 |
| 2 | Control (neg.) | 807 | 1.33 |
|   | Test 1 | 262 | 0.44 |
| 3 | Control (neg.) | 504 | 0.84 |
|   | Test 2 | 0 | 0.00 |
| 4 | Control (neg.) | 578 | 0.96 |
|   | Test 3 | 38 | 0.06 |
| 5 | Control (neg.) | 1055 | 1.76 |
|   | Control (post.) | 365 | 0.61 |

*Polyethylene Glycol 400 + 5 ml dist. water used as vehicle in all conditions.

ACTIVITY RESULTS

| No. of Animals | Condition | Corrected* Activity | Activity** Coefficient |
|---|---|---|---|
| 1 | Standard | 0.261 | 0.086 |
| 3 | Test | .131 | .216 |
| 1 | Positive Control | .347 | — |

*Activity After Material Dose
Activity Before Material Dose
**Corrected Activity Positive Control — Corrected Activity Condition The higher the score, the more tranquilizing activity exhibited.

The product, P-1874, was additionally tested for tranquilizing activity by the method of Horn, described in Example 1. The $LD_{50}$ by intravenous administration was 180.0 (56.0–560.0) mg/kg. The median effective dose for tranquilization was 32.0 mg/kg (10.0–100.0) and the safety factor was 5.6.

EXAMPLE 3

4,4-Dimethyl-2-(2-m-nitrophenylethenyl)-2-thiazoline (P-1897) was prepared by the process of Example 1 except that 2-nitrobenzaldehyde was substituted for p-chlorobenzaldehyde.

The acute $LD_{50}$ by oral administration to mice was determined to be approximately 1220 mg/kg. The $LD_0$ was 1000 mg/kg and the $LD_{100}$ was 1500 mg/kg. The animals receiving the compound appeared to be hypersensitive suggesting that the compound was a nervous system irritant at doses over 1000 mg/kg.

The product was additionally tested by the method of Horn. The $LD_{50}$ by intravenous administration was 320 mg/kg and the median effective dose for tranquilization was 10.0 (3.2–32.0) mg/kg. The safety factor was 10.0.

EXAMPLE 4

4,4-Dimethyl-2-[2-(3,4-methylenedioxyphenyl)-ethenyl]-2-thiazoline (P-1908) was prepared by the method of Example 1 except that 3,4-methylenedioxybenzaldehyde was substituted for p-chlorobenzaldehyde.

The acute $LD_{50}$ by oral administration to mice was determined to be approximately 3000 mg/kg. The $LD_0$ was 1400 mg/kg and the $LD_{100}$ was > 5000 mg/kg. Animals receiving the compound were tranquilized.

The product was additionally tested for tranquilizing activity by the method of Horn. It was administered as a suspension in 0.5% methyl cellulose in water. The $LD_{50}$ by intravenous administration was 180.0

(56.0–560.0) mg/kg. The median effective dose for tranquilization was 10.0 (3.2–32.0) mg/kg and the safety factor was 18.0.

EXAMPLE 5

4,4-Dimethyl-2-[2-(3-pyridyl)ethenyl]-2-thiazoline (P-1903) was prepared from pyridine-3-carboxaldehyde and 2,4,4-trimethyl-2-oxazoline according to the method of Example 1.

The acute oral toxicity was determined by administration to mice. The $LD_{50}$ was approximately 3000 mg/kg. The $LD_0$ was approximately 1400 mg/kg and the $LD_{100}$ was greater than 5000 mg/kg. Animals receiving the compound were tranquilized.

The product was additionally tested by the method of Horn. The $LD_{50}$ by intravenous administration was 180.0 (56.0–560.0) mg/kg. The median effective dose for tranquilization was 10.0 (3.2–32.0) mg/kg, and the safety factor was 18.0.

EXAMPLE 6

2-(2-p-acetamidophenylethenyl)-4,4-dimethyl-2-thiazoline (P-1909) was prepared from p-acetamidobenzaldehyde and 2,4,4-trimethyl-2-thiazoline according to the method of Example 1.

The acute oral toxicity was determined by administration to mice. The $LD_{50}$ was 1500 ± 246 mg/kg. The $LD_0$ was approximately 500 mg/kg and the $LD_{100}$ was 3000 mg/kg. Animals receiving the product were mildly tranquilized. The compound was also tested in accordance with the method of Horn. The $LD_{50}$ by intravenous administration was 180.0 mg/kg (56.0–560.0). The median effective dose for tranquilization was 18.0 mg/kg (5.6–56.0) and the safety factor was 10.0.

EXAMPLE 7

4,4-Dimethyl-2-(p-methoxybenzyl)-2-thiazoline (P-1881) was synthesized as follows. To a 500 ml flask there was charged 4-methoxyphenylacetonitrile 25.34 g (0.17 mole) dissolved in 200 ml xylene. The flask was equipped with a thermometer, a gas inlet tube connected to a hydrogen sulfide supply, a reflux condenser, dropping funnel and a stirrer. A solution of 2,2-dimethylaziridine 12.1 g (0.17 mole) dissolved in xylene, to 60 ml was placed in the dropping funnel.

Hydrogen sulfide was passed into the nitrile solution with stirring at room temperature and after a few minutes, drop-wise addition of the aziridine was started and continued until the temperature started to rise. It was then interrupted until the temperature began to drop, then addition of the aziridine was gradually completed. After the temperature began to drop, the hydrogen sulfide was turned off and the solution was heated at 145°–147° for about 10 hours.

The cooled reaction product was washed with water, dried over sodium sulfate and distilled through a 15 inch Vigreux column. The fraction distilling at 96°–120° at about 0.34–0.40 mm was dissolved in benzene, and extracted with dilute hydrochloric acid solution. The extract was neutralized with aqueous sodium bicarbonate solution and this mixture was extracted with benzene. The benzene solution was dried over sodium sulfate and evaporated.

The residue was distilled through a 15 inch Vigreux column and the fraction distilling at 118°, 0.34 mm, was selected as the product. It analyzed 66.31% carbon, 7.20% hydrogen, 5.80% nitrogen, and 13.46% sulfur. These values were in good agreement with the calculated values for the expected product, viz. carbon 66.35%, hydrogen 7.28%, nitrogen 5.95%, and sulfur 13.63%. The infra-red absorption spectrum was consistent with the expected structure.

The acute oral toxicity was determined by administration to mice. The $LD_{50}$ was 740 ± 127 mg/kg. The $LD_0$ was 400 mg/kg and the $LD_{100}$ was 1000 mg/kg. Animals receiving from 200–800 mg/kg were tranquilized.

The product was tested for tranquilizing activity by the method of Horn. The $LD_{50}$ by intravenous administration was 180.0 (56.0–560.0) mg/kg. The median effective dose for tranquilization was 18.0 (5.6–56.0) mg/kg and the safety factor was 10.0.

EXAMPLE 8

2-Benzyl-4,4-dimethyl-2-thiazoline (P-1880) was made by the following synthesis. 2-Amino-2-methyl-1-propanol was reacted with sulfuric acid to form the acid ester and internal salt. This product was dropped into sodium hydroxide solution thereby forming

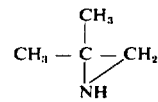

which volatilized and was recovered by condensation. This compound was then treated with phenylacetonitrile and hydrogen sulfide to form P-1880.

The acute $LD_{50}$ by oral administration to mice was 740 ± 127 mg/kg. Animals receiving the compound were moderately tranquilized.

The compound was additionally tested by the method of Horn. The $LD_{50}$ by intravenous administration was 180.0 (56.0–560.0) mg/kg. The median effective dose for tranquilization was 32.0 (10.0–100.0) mg/kg and the safety factor was 5.6.

EXAMPLE 9

4,4-Dimethyl-2-(2-p-nitrophenylethenyl)-2-thiazoline (P-1910) was prepared by reacting p-nitrobenzaldehyde with 2,4,4-trimethyl-2-thiazoline. The boiling point of the product was 174°–202° at 0.2 mm; the melting point was 124°–127° and the nmr spectrum was consistent with the proposed structure. The oral $LD_{50}$ by administration to mice was greater than 3000 mg/kg.

The compound was tested for tranquilizing activity by the method of Horn. The $LD_{50}$ by intravenous administration to mice was 180.0 mg/kg (56.0–560.0). The median effective dose for tranquilization was 10.0 mg/kg (3.2–32.0), and the safety factor was 18.0.

EXAMPLE 10

2-(2-p-methoxyphenylethenyl)-2-thiazoline (P-1917) was prepared by reacting p-anisaldehyde with 2,4,4-trimethyl-2-thiazoline. The product had a melting point of 96°–98° and the nmr spectrum was consistent with the proposed structure.

The compound was tested for tranquilizing activity by the method of Horn. The $LD_{50}$ by intravenous administration to rats was 180.0 mg/kg (56.0–560.0). The median effective dose for tranquilization was 5.6 mg/kg (1.8–18.0) and the safety factor was 32.0.

I claim:

1. A method of tranquilizing warm-blooded animals comprising administering thereto tranquilizing amounts of a compound or a pharmaceutically acceptable salt thereof, corresponding to the formula

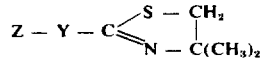

wherein Z is phenyl, p-chlorophenyl, p-methoxyphenyl, 3-nitrophenyl, 3,4-methylenedioxophenyl, p-acetamidophenyl or pyridyl; Y is —$(CH_2)_n$— where n is 1 or 2 or

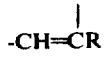

and R is hydrogen or methyl.

2. The method of claim 1 wherein Z is phenyl.

3. The method of claim 1 wherein Z is p-chlorophenyl.

4. The method of claim 1 wherein Z is p-methoxyphenyl.

5. The method of claim 1 wherein Z is 3-nitrophenyl.

6. The method of claim 1 wherein Z is 3,4-methylenedioxophenyl.

7. The method of claim 1 wherein Z is p-acetamidophenyl.

8. The method of claim 1 wherein Z is pyridyl.

9. The method of claim 1 wherein Y is -CH=CR wherein R is hydrogen or methyl.

10. The method of claim 1 wherein Y is —$(CH_2)_n$— wherein n is 1 or 2.

UNITED STATES PATENT OFFICE
CERTIFICATE OF CORRECTION

Patent No. 3,911,131      Dated October 7, 1975

Inventor(s) Herbert L. Wehrmeister

It is certified that error appears in the above-identified patent and that said Letters Patent are hereby corrected as shown below:

In the Abstract, fourth line from the top, counting the formula as one line, "-CH=C-R" should read -- $-CH=\overset{|}{C}-R$ --

Signed and Sealed this

Seventeenth Day of May 1977

[SEAL]

Attest:

RUTH C. MASON
*Attesting Officer*

C. MARSHALL DANN
*Commissioner of Patents and Trademarks*